ically decomposing hydrogen peroxide,
United States Patent

Reinhardt

[11] 3,882,223
[45] May 6, 1975

[54] METHOD AND APPARATUS FOR CATALYTICALLY DECOMPOSING A SOLUTION FOR GENERATING OXYGEN THEREFROM

[75] Inventor: Paul W. Reinhardt, Roane County, Tenn.

[73] Assignee: Acorn Associates, Inc., Oak Ridge, Tenn.

[22] Filed: Aug. 6, 1973

[21] Appl. No.: 385,635

[52] U.S. Cl. ................................. 423/579; 23/282
[51] Int. Cl. .............................................. C01b 13/00
[58] Field of Search ............. 423/579; 23/282, 288; 252/441

[56] References Cited
UNITED STATES PATENTS
2,627,454  2/1953  Tschinkel............................ 23/282
2,836,570  5/1958  Peers.................................. 252/441
3,542,524  11/1970  Kimble et al. ....................... 23/282

FOREIGN PATENTS OR APPLICATIONS
602,283  3/1936  France.............................. 423/579

Primary Examiner—O. R. Vertiz
Assistant Examiner—Wayne A. Langel
Attorney, Agent, or Firm—Colton & Stone, Inc.

[57] ABSTRACT

In the catalytic decomposition of hydrogen peroxide, nitric acid or acetic acid is added to the hydrogen peroxide in order to minimize catalyst degradation and to provide an improved oxygen production rate. For use in the areation of water in aquariums or minnow buckets, means are provided for adjusting the rate of oxygen production in accordance with temperature.

9 Claims, 6 Drawing Figures

METHOD AND APPARATUS FOR CATALYTICALLY DECOMPOSING A SOLUTION FOR GENERATING OXYGEN THEREFROM

This invention relates to improved method and apparatus for the generation of oxygen by the decomposition of hydrogen peroxide. The invention finds application in a large variety of systems requiring a compact, light weight oxygen generator, such as the areation of water in aquariums and minnow buckets, hospital or emergency oxygen tent usage and the like.

In a typical commercial application of the device shown in U.S. Pat. No. 3,542,524, there is provided a hydrogen peroxide decomposition oxygen generating apparatus for use in a bait bucket or the like. After the decomposition process has begun, the oxygen production rate reaches a fairly early maximum and then decreases exponentially. The characteristic oxygen production rate is not desirable for many applications, such as in a bait bucket. It is highly desirable that the oxygen production rate increase very rapidly from zero since the ordinary fisherman would not begin oxygen production until the bucket had been charged with bait. It will be apparent that postponing a reasonably adequate production rate can have disadvantageous effects on bait in the bucket. It will also be apparent that the oxygen requirement of bait in a bucket decreases upon removal of minnows or shrimp therefrom. Since the removal of bait from the bucket is probably not exponential, it will be apparent that the exponentially oxygen production rate is not well matched with the oxygen requirement.

Another disadvantage of the device illustrated in U.S. Pat. No. 3,542,524 is that the oxygen generator must necessarily be submerged if used in a minnow bucket, aquarium or the like. This has the disadvantage that the hydrogen peroxide solution approaches the temperature of the water in the aquarium or minnow bucket which may or may not be a desirable temperature for controlling the rate of hydrogen peroxide decomposition.

References of interest are U.S. Pat. Nos. 2,627,454; 2,836,570; and 3,594,232.

In summary, the method of this invention comprises providing a water-hydrogen peroxide solution, adding to the solution an acid which reacts with lead oxide to produce a water soluble lead salt and another reaction product which is not gaseous and deleterious to animal life, placing a decomposition catalyst comprising catalytically active lead in contact with the solution and recovering oxygen therefrom.

In summary, the apparatus of this invention comprises a water containing receptacle, a container having therein a hydrogen peroxide solution, means mounting the container relative to the receptacle for movement between positions substantially in and substantially out of the water, an oxygen outlet submerged in the receptacle and a conduit interconnecting the container and the oxygen outlet.

IN THE DRAWINGS:

FIG. 1 is a vertical cross sectional view of an apparatus in accordance with the principles of this invention illustrating the hydrogen peroxide container substantially submerged in an aquarium, minnow bucket or the like;

FIG. 2 is a reduced view similar to FIG. 1 illustrating the hydrogen peroxide container substantially withdrawn from water in an aquarium, minnow bucket or the like;

It is well known that hydrogen peroxide decomposes in the presence of a decomposition catalyst to yield water and oxygen in accordance with the following equation:

$$H_2O_2 \xrightarrow{\text{catalyst}} H_2O + 1/2\ O_2.$$

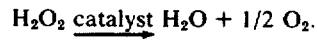

While many different catalysts are effective in this reaction, a large number of them are expensive and accordingly out of the question for use in oxygen generators for bait buckets, aquariums and the like. One class of relatively inexpensive effective catalysts includes a substantial percentage of lead. In this group are Wood's metal (50% Bi, 25% Pb, 12.5% Cd, 12.5% Sn), type metal etched with nitric acid, and a lead-antimony alloy which has a typical composition of 6-7% Sb, balance lead. Typical oxygen production characteristics are shown by curve 10 in FIG. 3 for a lead-antimony catalyst. It will be seen that the oxygen production rate reaches an early maximum and then declines exponentially. This oxygen production characteristic is not particularly suited for use in bait buckets for two reasons. The oxygen consumption of bait in the bucket depends upon temperature, the level of the dissolved oxygen and the number of minnows or shrimp in the bucket. The ordinary fisherman would not commence production until the bucket were charged with bait. Consequently, there is a finite period of time during which oxygen production might conceivably be insufficient for life support. The oxygen production characteristic is also undesirable since it declines exponentially from the one hour maximum. Bait consumption is probably more linear than exponential. Consequently it is desirable that the oxygen production rate not decline quite so precipitously. For aquarium use, oxygen consumption is rather constant. Accordingly, rapidly declining oxygen production is particularly undesirable.

Figure 1:
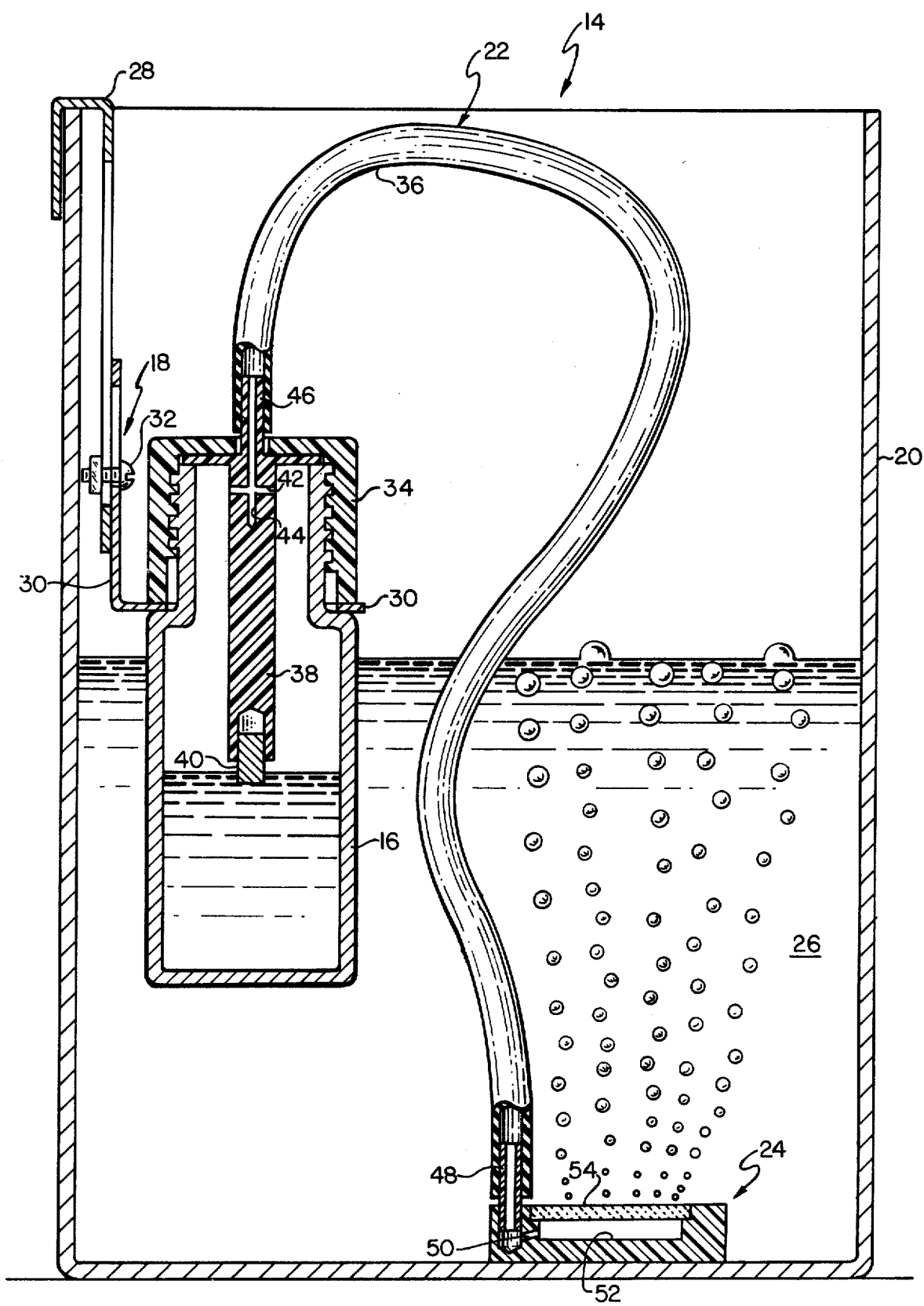

Referring to FIG. 1, there is illustrated an oxygen production device 14 made in accordance with the principles of this invention. The device 14 comprises as major components a container 16 for holding a hydrogen peroxide solution, means 18 for mounting the container 16 on a larger container 20 such as an aquarium or a bait bucket, and means 22 for delivering produced oxygen from the container 16 to an oxygen outlet 24 in the bottom of the bait bucket 20.

The container 16 may be sized to provide sufficient hydrogen peroxide for any desired rate and duration of oxygen production. It has been found, however, that a container capable of holding 17.5 ounces of 7.5% hydrogen peroxide will produce sufficient oxygen at an acceptable rate to keep a conventional sized bait bucket aerated for a period of time in excess of eight hours.

As will become more fully apparent hereinafter, the mounting means 18 in conjunction with the oxygen outlet 24 and the delivery means 22 provides means for at least partially controlling the rate of oxygen production. Upon reflection, it will be apparent that the temperature of the water 26 in the container 20 is normally different from air temperature. This is particularly true in a bait bucket of the type that is perforated in the bottom and placed over the side of a boat or submerged adjacent a fishing pier. In this circumstance, water temperature in the wintertime is normally lower than air temperature while in the wintertime water temperature is normally higher than air temperature. It is well known that the hydrogen peroxide decomposition process accelerates with increasing temperature. Accordingly, if an individual decides that oxygen production is too rapid while fishing in the summertime, he may adjust the mounting means 18 to submerge the container 16 in the cooler water thereby decreasing the oxygen production rate. Similarly, if he decides that oxygen production rate is insufficient while fishing in the summertime, he can adjust the mounting means 18 to move the container 16 into the warmer air thereby increasing the temperature of the hydrogen peroxide solution.

The mounting means 18 may be of any suitable type and is illustrated as comprising a hook-shaped member 28 overlapping the upper edge of the bucket 20 and a second member 30 captivated to the container 16. The members 28, 30 are movable relative to each other and a connection 32 is provided for securing the same together in various positions thereof.

The oxygen delivery means 22 comprises a cap 34 which may be threaded over the top of the container 16 and a flexible conduit 36 leading to the oxygen outlet 24. The cap 34 is provided with a depending projection 38. A catalyst body 40 frictionally fits in the bottom of the projection 38. The upper end of the projection 38 provides an opening 42 leading to a passage 44 which communicates with the short rigid conduit or nipple 46. The flexible conduit 36 is slipped over the nipple 46 in a conventional fashion.

Figure 2:
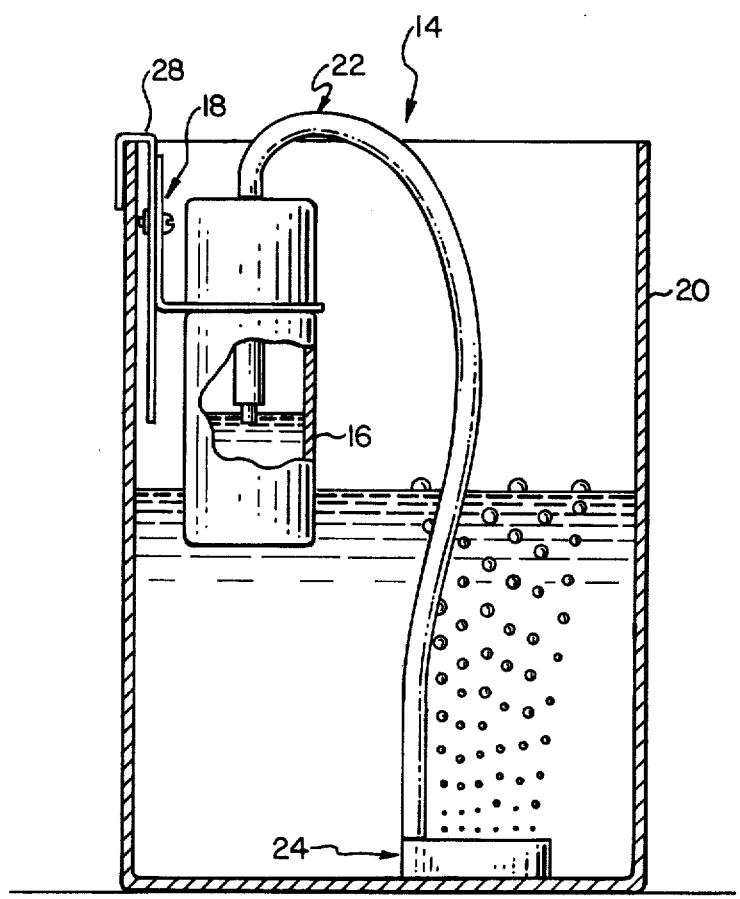

The flexible conduit 36 is of a suitable length to allow movement of the container 16 between the position shown in FIGS. 1 and 2. The lower end of the conduit 36 slips over the nipple 48 provided by the oxygen outlet 24. The oxygen outlet 24 provides a passage 50 leading from the nipple 48 to a central chamber 52. The chamber 52 is partially defined by an oxygen-permeable water-impermeable plug 54, such as glass frit or sintered metal. In shipment, the catalyst body 40 may be slipped out of the end of the projection 38 so that the container 16 might be sealed by the cap 34 without initiating decomposition of the hydrogen peroxide. In order to start oxygen production, the cap 34 may be unscrewed from the container 16, the catalyst body 40 slipped into the end of the projection 38 and the cap 34 replaced on the container 16 in order to at least partially submerge the catalyst body 40 in the hydrogen peroxide solution. Ideally, the level of hydrogen peroxide solution in the container 16 is sufficient to submerge the entire catalyst body 40. The amount of catalyst exposed to the hydrogen peroxide solution can be adjusted merely by sliding the catalyst body 40 relative to the projection 38.

Figure 3:
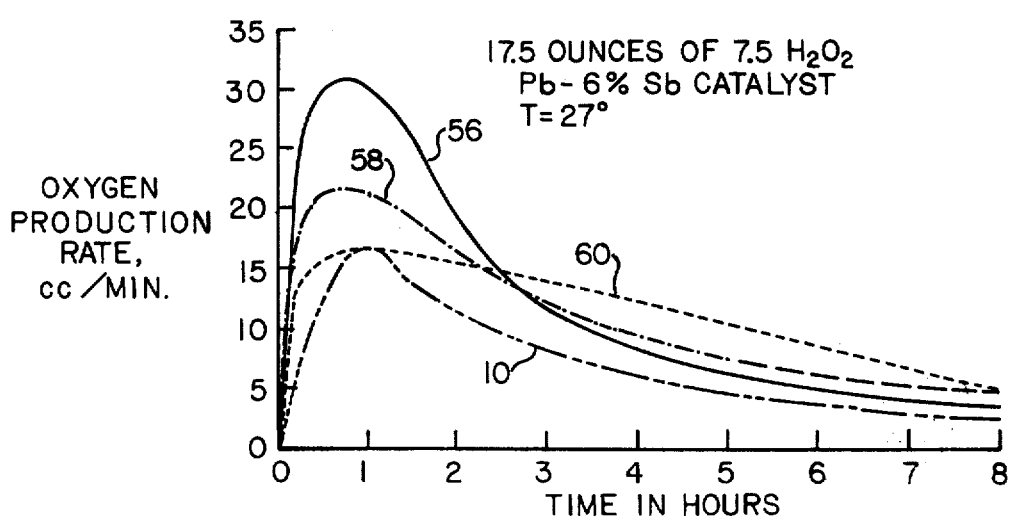
FIGS. 3-5 are graphs showing the relationship of oxygen production with time illustrating the effect of adding nitric acid and acetic acid to the hydrogen peroxide solution.

Referring to FIG. 3, there is illustrated the effect of nitric acid addition on oxygen production using an etched lead-antimony catalyst in an apparatus corresponding to FIG. 1. 17½ ounces of 7.5 percent by weight hydrogen peroxide was placed in the container 16 for each of the trials The catalyst body 40 had an apparent surface area of 0.4 square inches. The material of the catalyst body 40 consisted of 6 percent antimony, balance lead and had been etched with nitric acid. The container 16 was substantially wholly submerged in a body of water maintained at a constant temperature of 27°C.

In trial No. 1, curve 10 illustrates the relationship between oxygen production rate and time without nitric acid addition. The oxygen production rate reaches a relatively modest maximum at about 1 hour and then declines exponentially.

In trial No. 2, curve 56 illustrates the relationship between oxygen production rate and time when adding three drops (20 drops to the cubic centimeter) of 35 percent by weight nitric acid per 8 ounces of hydrogen peroxide solution. It will be apparent that the rate of oxygen production increases substantially quicker than curve 10. It will also be apparent that the rate of oxygen production decreases from its maximum at a substantial rate but that the instantaneous oxygen production rate exceeds the production rate without addition of nitric acid during the entire eight hour test period.

In trial No. 3, curve 58 illustrates an identical situation except that five drops (20 drops to the cubic centimeter) of 35 percent by weight nitric acid per 8 ounces of hydrogen peroxide solution was added. It will be apparent that the rate of oxygen production increases quite rapidly to a maximum between 40 and 60 minutes. The rate of oxygen production then declines exponentially. The instantaneous oxygen production rate with the addition of five drops of nitric acid was above the oxygen production rate without nitric acid addition during the entire 5 hour test period. The slope of the curve 58 between the third and fifth hour suggests that the instantaneous oxygen production rate would remain above the zero nitric acid trial throughout an eight hour trial.

In trial No. 4, curve 60 illustrates the relationship between oxygen production rate and time with the addition of six drops (20 drops to the cubic centimeter) of 35 percent by weight nitric acid. During the first 10 minutes, the oxygen production rate climbed quite rapidly. At about the ten minute mark, the rate of increase of oxygen production began to decline. The oxygen production rate reached a maximum at about the 1 hour mark. The oxygen production rate in this trial declined substantially linearly frm the maximum at one hour to the end of the 8 hour trial.

The addition of nitric acid appears to have several effects on the decomposition of hydrogen peroxide. First, nitric acid further etches the catalyst thereby increasing the ratio of actual surface area to apparent surface area. For this reason, the addition of nitric acid causes a much more rapid increase in oxygen production. Second, the addition of nitric acid keeps the surface of the catalytically active lead of lead oxide. Lead in the catalyst apparently reacts with produced oxygen to form a non-catalytic lead oxide. By adding nitric acid to the hydrogen peroxide solution, any lead oxide produced is converted to water soluble lead nitrate which dissolves in the water based hydrogen peroxide solution. Third, nitric acid also acts as a stabilizer for hydrogen peroxide. As the pH of the hydrogen peroxide decreases, the solution becomes more stable. Conversely, as the pH of the hydrogen peroxide solution increases, the hydrogen peroxide becomes less stable and thereby more effective in producing oxygen.

The shapes of the curves 10, 56, 58, 60 provide the basis for spectulative conclusions concerning the primary effect of nitric acid addition at various times in the oxygen production cycle. It seems rather apparent that the initial steep rise in oxygen production rate with nitric acid addition is the result of additional etching of the lead catalyst. After initial etching, the shape of the curves 56, 58, 60 appears to be a combination of the effect of pH on hydrogen peroxide decomposition and the accumulation of lead oxide on the catalyst. For example, in curve 56 the maximum production rate is substantially greater than that for the curve 58. This might be explained on the basis that the nitric acid is wholly expended between 10 and 30 minutes so that the pH of the hydrogen peroxide solution is no longer low. Moderate to high pH coupled with a large area of catalytically active lead should produce a substantial burst of oxygen production. In the test represented by curve 60, there is a large area of catalytically active lead available for reaction at the 10 minute mark. However, the pH of the solution is probably quite low thereby tending to stabilize the hydrogen peroxide solution. Thus, the bend in the curve 60 at the 10 minute mark suggests that the pH of the hydrogen peroxide solution is the limiting factor on oxygen production rate. As the oxygen production declines from its maximum, the rate of decline appears to be controlled by a combination of lead oxide accumulation on the catalyst and solution pH. It seems reasonable to conclude that the decline of production in the trial illustrated by curve 56 is controlled substantially wholly by lead oxide accumulation.

Another interesting conclusion is evidenced from Table I which is a rough approximation of total oxygen produced during each of the trials during the time periods noted. It will be apparent from the total oxygen produced during trials Nos. 2–4 that the addition of nitric acid to the hydrogen peroxide solution resulted in the production of about 1½ as much oxygen as in trial No. 1. It is thus abundantly apparent that the hydrogen peroxide solution in trial No. 1 was not spent but that the catalyst had obviously become ineffective because of lead oxide accumulation.

It is apparent that the oxygen volumes reported in Table I are only a rough approximation and are instructive only by a comparison of the various trials. Calculations show that the theoretical oxygen yield of a 17.5 ounce batch of 7.5 percent hydrogen peroxide should be about 5,200 cubic centimeters. It is accordingly apparent that the total oxygen yield in trials 2–4 is in error. The test apparatus used included a flow meter indicating instantaneous flow rate. It appears that the flow meter was reading high. The volumetric figures reported in Table I were obtained by a rough integration under the curves 10, 56, 58, 60 which is also obviously subject to error. There also appears to be some error in the concentration of the solution since it was made by diluting a 35 percent by weight solution. Accordingly, the error apparent in Table I appears to be a combination of flow measurement, curve integration and mixture strength.

Figure 4:
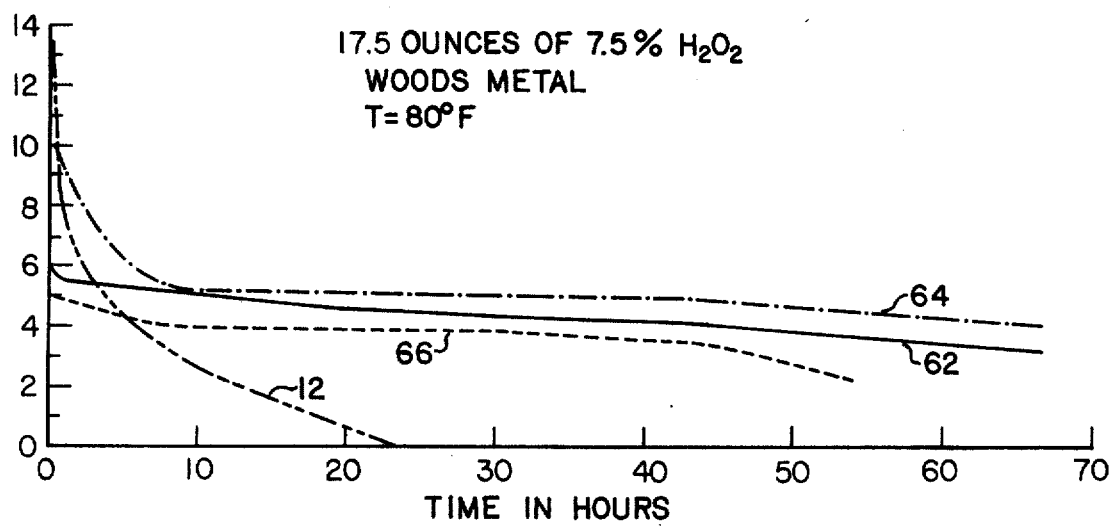

Referring to FIG. 4, there is illustrated the effect of acetic acid addition on oxygen production using a Wood's metal catalyst in an apparatus corresponding to FIG. 1. 17½ ounces of 7.5 percent by weight hydrogen peroxide was placed in the container 16 for each of the trials. The catalyst body 40 had an apparent surface area of 1.2 square inches. The material of the catalyst body consisted of Wood's Metal which had been etched with nitric acid. The container 16 was substantially wholly submerged in a body of water maintained at a constant temperature of 80°F.

Trial No. 1 constitutes a control with curve 12 illustrating the relationship between oxygen production rate and time without acetic acid addition. It will be apparent that the use of Wood's Metal as a catalyst and the use of a larger quantity of hydrogen peroxide effects oxygen production for a longer period of time. Accordingly, these conditions are particularly suitable for aquarium use. It will be quite evident, however, that the exponentially falling oxygen production rate is not desirable for aquarium use.

In trial No. 2, curve 62 illustrates the relationship between oxygen production rate and time when adding two drops (20 drops to the cubic centimeter) of 99.7 percent by weight acetic acid per eight ounces of hydrogen peroxide solution. It will be immediately apparent that the rate of oxygen production is quite stable from about 1 hour to the end of the trial.

In trial No. 3, curve 64 illustrates an identical situation except that four drops (20 drops to the cubic centimeter) of 99.7 percent by weight acetic acid per 8 ounces of hydrogen peroxide solution was added. It will be apparent that the oxygen production rate trails off a maximum at about one half hour to about 8 hours and then levels off.

In trial No. 4, curve 66 illustrates the relationship between oxygen production rate and time with the addition of six drops (20 drops to the cubic centimeter) of 99.7 percent by weight acetic acid per 8 ounces of hydrogen peroxide solution. Oxygen production proceeds at a fairly constant rate.

From the shape of the curves 62, 64, 66, it will be apparent that the use of Wood's Metal as a catalyst and a water-hydrogen peroxide-acetic acid system provides prolonged oxygen production at fairly constant rates which is exceptionally desirable for aquarium use. Indications are that this system will effectively aerate a moderate sized aquarium for about 30 days.

Figure 5:
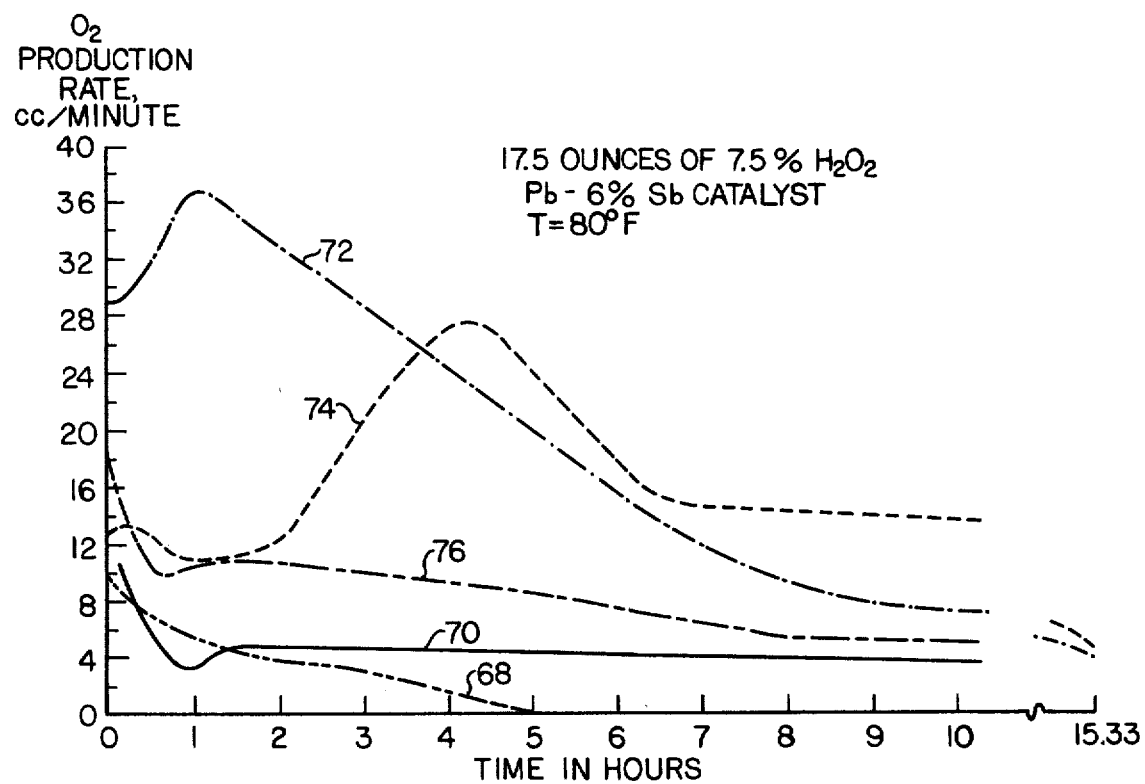

Referring to FIG. 5, there is illustrated the effect of acetic acid addition on oxygen production using a lead-antimony catalyst in an apparatus corresponding to FIG. 1. 17½ ounces of 7.5 percent by weight hydrogen peroxide was placed in the container 16 for each of the

TABLE I

| | OXYGEN PRODUCED (cubic centimeters) | | | |
|---|---|---|---|---|
| time in hours | trial #1 | trial #2 | trial #3 | trial #4 |
| 0-.33 | 80 | 280 | 270 | 190 |
| .33-.67 | 240 | 580 | 410 | 300 |
| .67-1 | 315 | 710 | 430 | 320 |
| subtotal | 635 | 1570 | 1110 | 810 |
| 1-2 | 790 | 1530 | 1110 | 960 |
| 2-3 | 600 | 900 | 840 | 870 |
| 3-4 | 450 | 600 | 660 | 770 |
| 4-5 | 375 | 420 | 510 | 675 |
| subtotal | 2850 | 5020 | 4230 | 4085 |
| 5-6 | 285 | 345 | 435 est | 575 |
| 6-7 | 210 | 270 | 360 est | 460 |
| 7-8 | 150 | 240 | 340 est | 345 |
| total | 3495 | 5875 | 5365 | 5465 |
| % increase in O₂ production | | 68.2% | 53.8% | 56.6% | trials. The catalyst body 40 had an apparent surface area of 0.6 square inches. The material of the catalyst body 40 consisted of 6 percent antimony, balance lead and had been etched with nitric acid. The container 16 was substantially wholly submerged in a body of water maintained at a constant temperature of 80°F.

In trial No. 1, curve 68 illustrates the relationship between oxygen production rate and time without acetic acid addition. It will be apparent that this is not satisfactory since oxygen production rate tails off rather rapidly and substantially stops at about the 5 hour mark.

In trial No. 2, curve 70 illustrates the relationship between oxygen production rate and time when adding two drops (20 drops to the cubic centimeter) of 99.7 percent by weight acetic acid per 8 ounces of hydrogen peroxide solution. It will be apparent that the oxygen production rate under these conditions declines very slowly after the 2 hour mark.

In trial No. 3, curve 72 illustrates the relationship between oxygen production rate and time when adding four drops (20 drops to the cubic centimeter) of 99.7 percent by weight acetic acid per 8 ounces of hydrogen peroxide solution. Oxygen production reaches a maximum at about the 1 hour mark and then declines substantially linearly to about the 6 hour mark and then declines more slowly.

In trial No. 4, six drops (20 drops to the cubic centimeter) of 99.7 percent by weight acetic acid was added per 8 ounces of hydrogen peroxide solution. Curve 74 is obviously atypical since the maximum oxygen production rate is not achieved until about the 4 hour mark. The exact mechanism which operates to create the delayed maximum is unknown. It will be evident that this trial is unique since it produces greater than 11 cc/minute of oxygen throughout a 10 hour test period.

In trial No. 5, curve 76 illustrates the same relationship except that 1 cubic centimeter of 99.7 percent by weight acetic acid was added per 16 ounces of hydrogen peroxide solution. It is apparent that oxygen production rate declines fairly uniformly from 10 cc/minute at about forth minutes to 6 cc/minute at 10 hours.

There are several requirements for an effective acid to add to the hydrogen peroxide solution in order to achieve the results of this invention. First, the acid should react with lead oxide to produce a water soluble lead salt. Second, any gaseous reaction product of lead oxide and the acid should be innocuous to animal life. A typical gaseous reaction product that is innocuous to animal life is water in vapor form. Hydrochloric acid has proved unsuitable for this invention since its reaction with lead oxide releases free chlorine which passes along with the produced oxygen to the oxygen outlet 24. It is readily apparent that chlorinating the water in the bait bucket 20 is not conducive to long bait life. Sulfuric acid has proved unsuitable since the lead sulfate produced is water insoluble. Nitric acid has been shown to be quite satisfactory since the produced lead nitrate is quite water soluble. In addition, nitric acid is a good stabilizer for hydrogen peroxide since nitric acid is quite strong and acts to maintain pH at low levels. Acetic acid has proved acceptable since lead acetate is quite water soluble. Since acetic acid is not as strong an acid as nitric acid, acetic acid is not as effective in stabilizing hydrogen peroxide since it does not maintain pH as low as nitric acid. Since acetic and nitric acids do not interact or produce interfering compounds, mixtures of these acids are likewise operative in this invention. It seems apparent that any acid which reacts with lead oxide to form a water soluble lead salt and which does not produce a gaseous reaction product deleterious to animal life is operative in this invention.

It is apparent that the hydrogen peroxide solution may be of any desired strength. A solution of 7.5 percent by weight hydrogen peroxide has proved particularly satisfactory since stronger solutions require special handling and shipping provisions while weaker solutions obviously do not provide as much reactive material.

Any amount of nitric or acetic acid is effective in producing larger quantities of oxygen, as compared to a control. To maintain an instantaneous production rate larger than a control, it appears that any amount of nitric or acetic acid will suffice. To maintain a relatively steady oxygen production rate for a prolonged period, acetic acid in the range 8–50 ppm by weight hydrogen peroxide using a Wood's Metal catalyst has proved particularly effective while acetic acid in the range 5–200 ppm by weight hydrogen peroxide is feasible. To retard fall-off in production rate with a lead-antimony catalyst, nitric acid in the range 20–110 ppm by weight hydrogen peroxide or acetic acid in the range 5–50 ppm by weight hydrogen peroxide has proved particularly effective. Nitric acid addition in the range 10–500 ppm or acetic acid addition in the range 5–200 ppm is feasible.

Figure 6:
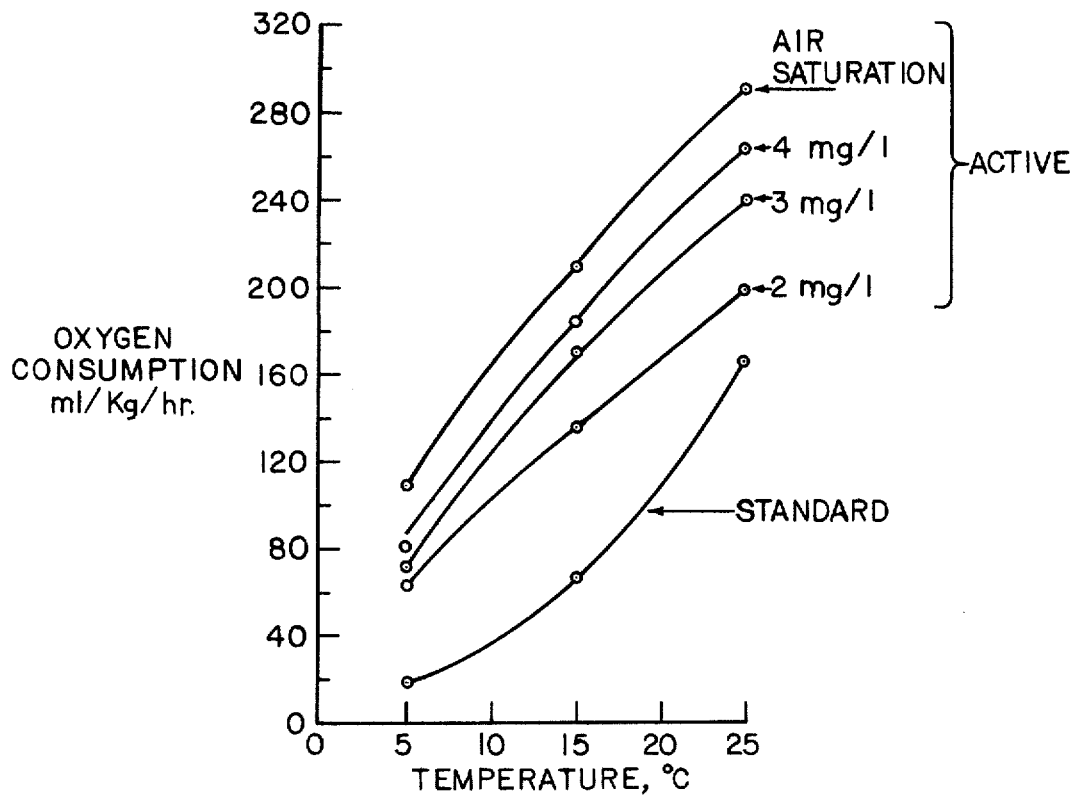
FIG. 6 is a graph showing the effect of oxygen content and temperature on oxygen consumption for a particular type fish.

There is shown in FIG. 6 the relationship between water temperature, air saturation in water and oxygen consumption of Perca flavescens. It is apparent that oxygen consumption of this species of fish increases substantially at increasing temperatures. Similar data are available from the literature for goldfish, *Salvelinus fontinalis and S. mamaycush.* It is fairly well accepted that the rate of typical chemical reactions approximately doubles for every 10°C increase in temperature, which is true for the catalytic decomposition of hydrogen peroxide. As shown in FIG. 6, oxygen consumption by fish is similarly affected by temperature changes. When the container 16 is kept in full contact with the water 26, the temperature of the hydrogen peroxide therein is maintained very nearly that of the water. The heat capacity of the water 26 is large compared to that of the hydrogen peroxide solution and container 16. With the container 16 substantially wholly submerged in the water 26, the oxygen production rate will increase or decrease according to the varying needs of the bait or fish because of temperature effect.

I claim

1. A method of generating oxygen comprising providing a water-based solution of hydrogen peroxide and an acid which reacts with lead oxide to form a reaction product selected from the group consisting of water soluble lead salts, water, gases innocuous to animal life and mixtures thereof; placing a hydrogen peroxide decomposition catalyst comprising an effective quantity of catalytically active elemental lead in contact with the solution; recovering oxygen from the solution; and minimizing degradation of catalyst performance comprising the concurrent steps of reacting the catalytic elemental lead with produced oxygen to form lead oxide and removing the lead oxide from the catalyst by reacting the same with the acid.

2. The method of claim 1 wherein the acid is nitric acid.

3. The method of claim 2 wherrein the nitric acid is in the range 10–500 ppm by weight hydrogen peroxide.

4. The method of claim 3 wherein the catalyst is 6–7% sb, balance lead and the nitric acid is in the range 20–110 ppm by weight hydrogen peroxide.

5. The method of claim 1 wherein the acid is acetic acid.

6. The method of claim 5 wherein the acetic acid is in the range of 5–200 ppm by weight hydrogen peroxide.

7. The method of claim 5 wherein the catalyst is Wood's metal and the acetic acid is in the range 5–50 ppm by weight hydrogen peroxide.

8. The method of claim 1 wherein the acid is selected from the group consisting of acetic acid, nitric acid and mixtures thereof.

9. A method of generating oxygen comprising providing a catalytically decomposable water-based hydrogen peroxide solution; placing an elemental lead decomposition catalyst which reacts with produced oxygen to form lead oxide in contact with the solution and recovering oxygen from the solution; the improvement in minimizing degradation of catalyst performance and in increasing instantaneous oxygen production rate throughout a production period of 0–8 hours comprising adding to the solution an acid which reacts with lead oxide to produce reaction products selected from the group consisting of water soluble lead salts, water, gases innocuous to animal life and mixtures thereof.

* * * * *